US010873257B2

(12) United States Patent
Harjani et al.

(10) Patent No.: US 10,873,257 B2
(45) Date of Patent: Dec. 22, 2020

(54) LOW DROPOUT REGULATOR WITH SMART OFFSET

(71) Applicant: Regents of the University of Minnesota, Minneapolis, MN (US)

(72) Inventors: Ramesh Harjani, Minneapolis, MN (US); Saurabh Chaubey, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/563,160

(22) Filed: Sep. 6, 2019

(65) Prior Publication Data

US 2020/0144913 A1    May 7, 2020

Related U.S. Application Data

(60) Provisional application No. 62/756,943, filed on Nov. 7, 2018.

(51) Int. Cl.
*G05F 1/565* (2006.01)
*G05F 1/575* (2006.01)
*H02M 3/07* (2006.01)

(52) U.S. Cl.
CPC ............ *H02M 3/073* (2013.01); *G05F 1/565* (2013.01); *G05F 1/575* (2013.01)

(58) Field of Classification Search
CPC .......... G05F 1/565; G05F 1/575; H02M 3/07; H02M 3/073

USPC ................................. 327/538, 540, 541, 543
See application file for complete search history.

(56) References Cited

U.S. PATENT DOCUMENTS

| 6,188,212 | B1 | 2/2001 | Larson et al. |
| 7,145,318 | B1* | 12/2006 | Chan ........................ G05F 1/465 |
| | | | 323/316 |
| 8,248,150 | B2 | 8/2012 | Tadeparthy et al. |
| 9,753,474 | B2 | 9/2017 | Zhang et al. |

(Continued)

OTHER PUBLICATIONS

Wu et al., "An All-Digital Power management Unit with 90% Power Efficiency and ns-order Voltage Transition Time for DVS Operation in Low Power Sensing SoC Applications," 2015 IEEE International Symposium on Circuits and Systems (ISCAS), May 2015, 4 pp.

(Continued)

*Primary Examiner* — William Hernandez
(74) *Attorney, Agent, or Firm* — Shumaker & Sieffert, P.A.

(57) ABSTRACT

A low-dropout (LDO) regulator. The LDO regulator includes a pass transistor, a charge pump connected to the pass transistor, and an error amplifier connected through the charge pump to the pass transistor, wherein the error amplifier receives a voltage $V_O$ from the pass transistor and generates a voltage $V_E$ based on the voltage $V_O$, wherein the charge pump receives the voltage $V_E$ from the error amplifier, generates a voltage $V_E^*$ that is lower than $V_E$ by an offset and supplies the voltage $V_E^*$ as a gate voltage to the pass transistor.

18 Claims, 9 Drawing Sheets

(56) References Cited

U.S. PATENT DOCUMENTS

| | | | | |
|---|---|---|---|---|
| 2009/0243571 | A1* | 10/2009 | Cook | G05F 1/575 323/280 |
| 2010/0013448 | A1* | 1/2010 | Motz | G05F 1/575 323/280 |
| 2017/0060155 | A1* | 3/2017 | Peluso | G05F 1/575 |

OTHER PUBLICATIONS

Okuma et al., "0.5-V Input Digital LDO with 98.7% Current Efficiency and 2.7-uA Quiescent Current in 65nm CMOS," Custom Integrated Circuits Conference (CICC), 2010 IEEE, Oct. 2010, 4 pp.

Onouchi et al., "A 1.39-V Input Fast-Transient-Response Digital LDO Composed of Low-Voltage MOS Transistors in 10-nm CMOS Process," IEEE Asian Solid-State Circuits Conference, Jeju, Korea, Nov. 14-16, 2011, 4 pp.

Chiu et al., "A 0.6V Resistance-Locked Loop Embedded Digital Low Dropout Regulator in 40nm CMOS with 77% Power Supply Rejection Improvement," 2013 Symposium on VLSI Circuits, IEEE, Jun. 12-14, 2013, 2 pp.

Yang et al., "A 0.6-1V Input Capacitor-Less Asynchronous Digital LDO with Fast Transient Response Achieving 9.5b over 500mA Loading Range in 65-nm CMOS," ESSCIRC Conference 2015—41st European Solid-State Circuits Conference (ESSCIRC), IEEE, Sep. 14-18, 2015, 4 pp.

Yang et al., "Fast-Transient Asynchronous Digital LDO with Load Regulation Enhancement by Soft Multi-Step Switching and Adaptive Timing Techniques," 2015 IEEE Custom Integrated Circuits Conference (CICC), IEEE, Sep. 28-30, 2015, 4 pp.

Tai et al., "A Digital Low-Drop-Out Regulator with Wide Operating Range in a 16nm FinFET CMOS Process," IEEE Asian Solid-State Circuits Conference, Xiamen, Fujian, China, Nov. 9-11, 2015, 4 pp.

Yang et al., "A 65nm Inverter-Based Low-Dropout Regulator with Rail-to-Rail Regulation and over -20dB PSR at 0.2V Lowest Supply Voltage," IEEE International Solid-State Circuits Conference, Session 5, Analog Techniques, 5.11, Feb. 6, 2017, 3 pp.

Tan et al., "A Fully-on-Chip Low-Voltage Low-Dropout Regulator with Negative Charge Pump," 2018 IEEE International Conference on Electron Devices and Solid State Circuits (EDSSC), Jun. 6-8, 2018, 2 pp.

Chaubey et al., "A Smart-Offset Analog LDO with 0.3V Minimum Input Voltage and 99.1% Current Efficiency," IEEE Asian Solid-State Circuits Conference, Seoul, Korea, Nov. 6-8, 2017, 4 pp.

Abdelfattah et al., "An Ultra-Low-Voltage CMOS Process-Insensitive Self-biased OTA With Rail-to-Rail Input Range," IEEE Transactions on Circuits and Systems—I: Regular Papers, vol. 62, No. 10, Oct. 2015, 11 pp.

Harjani et al., "Design of PVT Tolerant Inverter Based Circuits for Low Supply Voltages," IEEE Custom Integrated Circuits Conference, CICC, Nov. 25, 2015, 8 pp.

Ferreira et al., "A 60-dB Gain OTA Operating at 0.25-V Power Supply in 130-nm Digital CMOS Process," IEEE Transactions on Circuits and Systems—I: Regular Papers, vol. 61, No. 6, Jun. 2014, 9 pp.

* cited by examiner

Small-signal system model and frequency response

Output ripple and charge-pump frequency for different input $V_{DD}$

LOW DROPOUT REGULATOR WITH SMART OFFSET

This application claims the benefit of U.S. Provisional Application No. 62/756,943 entitled "LOW DROPOUT REGULATOR WITH SMART OFFSET," and filed on Nov. 7, 2018. The entire content of Application No. 62/756,943 is incorporated herein by reference.

TECHNICAL FIELD

The disclosure relates to voltage regulators.

BACKGROUND

With the growing need of managing power consumption coupled with continuous technology scaling, the use of near threshold supply circuits have become popular in VLSI subsystems, including processors, memory, and PLLs. Unfortunately, circuits which operate at near-threshold voltages, are highly sensitive to supply voltage variations, increasing the need for ripple-free power management. Ripple suppression becomes even more critical for analog loads at these lower supply voltages.

SUMMARY

A negative voltage offset placed between the error amplifier and pass transistor may provide the necessary gate-source headroom at low input voltages. The negative voltage offset may be a fixed offset, or may vary based on a parameter such as a supply voltage VDD.

In one example, a low-dropout (LDO) regulator includes a pass transistor, a charge pump connected to the pass transistor, and an error amplifier connected through the charge pump to the pass transistor, wherein the error amplifier receives a voltage $V_O$ from the pass transistor and generates a voltage $V_E$ based on the voltage $V_O$ and a reference voltage. The charge pump receives the voltage $V_E$ from the error amplifier, generates a voltage $V_E^*$ that is lower than $V_E$ by an offset and supplies the voltage $V_E^*$ as a gate voltage to the pass transistor.

In another example, a negative voltage offset low-dropout (NVO-LDO) regulator includes a pass transistor and a negative voltage offset circuit connected to the pass transistor, wherein the negative voltage offset circuit receives an error voltage $V_E$, forms an offset error voltage $V_E^*$, and applies the offset error voltage $V_E^*$ to a gate of the pass transistor, wherein forming includes operating four switched capacitors A-D during two non-overlapping phases, Φ1 and Φ2 such that during phase Φ1, capacitor A gets charged to the error voltage $V_E$, capacitor B gets charged to $V_{DD}/2$ and capacitors C and D get charged to ≈0.5V, and during phase Φ2, all the capacitors are connected in series with the capacitors C and D having opposite polarity.

In another example, a negative voltage offset low-dropout (NVO-LDO) regulator includes a pass transistor and a charge pump connected to the pass transistor. The charge pump includes four switched capacitors A-D. In operation, the charge pump receives an error voltage $V_E$ and forms an offset error voltage $V_E^*$, wherein forming includes operating the four switched capacitors A-D in the charge pump during two non-overlapping phases, Φ1 and Φ2, such that during phase Φ1, capacitor A gets charged to the error voltage $V_E$, capacitor B gets charged to $V_{DD}/2$ and capacitors C and D get charged to ≈0.5V, and during phase Φ2, all the capacitors are connected in series with the capacitors C and D having opposite polarity; and applies the offset error voltage $V_E^*$ to a gate of the pass transistor.

In another example, in an LDO regulator having a supply voltage $V_{DD}$, a method including receiving an error voltage $V_E$ and generating an offset error voltage $V_E^*$ from the offset error voltage $V_E$, wherein generating includes operating a charge pump having four switched capacitors A-D using a clock having two non-overlapping phases, Φ1 and Φ2, such that during phase Φ1, capacitor A gets charged to the error voltage $V_E$, capacitor B gets charged to $V_{DD}/2$ and capacitors C and D get charged to ≈0.5V, and during phase Φ2, all the capacitors are connected in series with the capacitors C and D having opposite polarity.

In yet another example, an LDO regulator includes a pass transistor connected to an LDO supply voltage $V_{DD}$ and an offset module connected to the pass transistor, wherein the offset module receives an error voltage $V_E$, and provides a voltage $V_E^*$ to a gate of the pass transistor, wherein $V_E^* = V_E - \Phi V_{OS}$, where $V_{OS} = A - A \times V_{DD}$, where A is a number between zero and one.

DETAILED DESCRIPTION

Low-dropout (LDO) regulators play an important role in ripple-free power management. They provide both ripple suppression and isolation from switching regulators. LDOs often use PMOS pass transistors to lower drop out voltages and increase power efficiency. It is difficult, however, for analog LDOs to maintain the necessary gate-source headroom at input voltages below 0.5V.

Digital LDOs (D-LDOs) have been developed to circumvent the headroom problem. D-LDOs replace the all-analog controller of the analog LDO with digital logic and/or time-to-digital conversion. D-LDOs fully switch the pass transistor on/off and, therefore, require no additional headroom. D-LDOs have, however, an inherent ripple even for a constant load due to the finite resolution of switch sizes.

Figure 1:
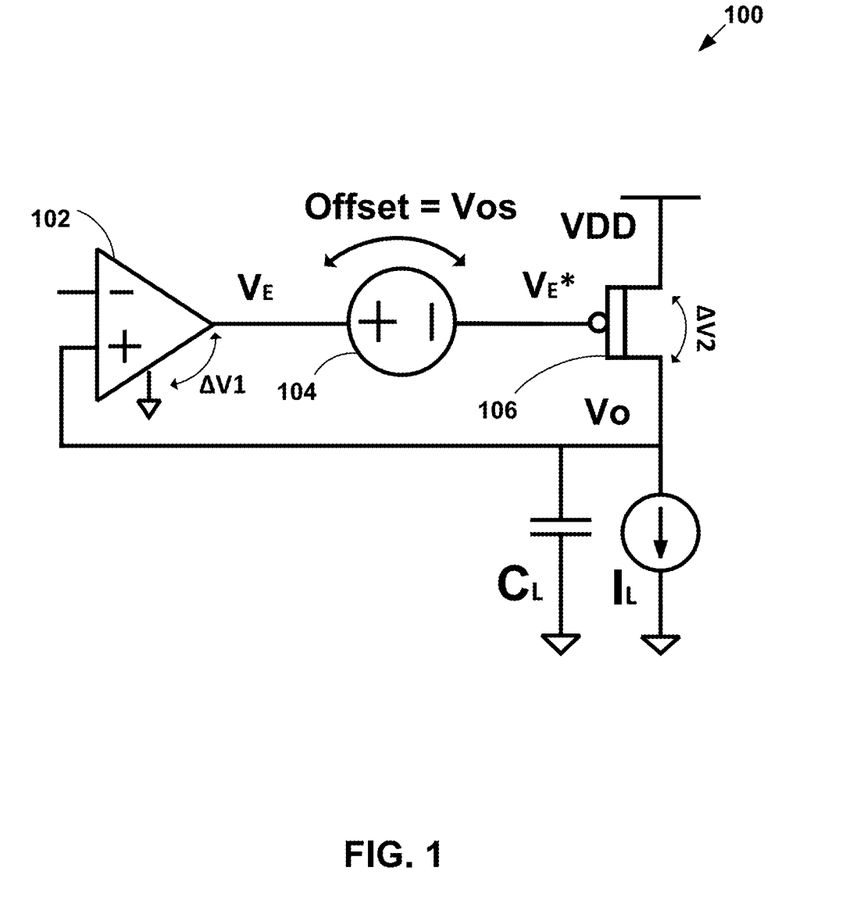
FIG. 1 is a conceptual diagram illustrating an LDO having a negative voltage offset (NVO) connected between the error amplifier and the pass transistor, according to aspects of the disclosure.

FIG. 1 is a conceptual diagram illustrating an LDO having a negative voltage offset (NVO) 104 connected between the error amplifier and the pass transistor, according to aspects of the disclosure. A negative voltage offset placed between the error amplifier and pass transistor may provide the necessary gate-source headroom at input voltages below 0.5V. In the example approach of FIG. 1, LDO 100 includes a negative voltage offset 104 connected between the error amplifier (EA) 102 and the pass transistor 106. In some example approaches, NVO 104 provides an analog solution for handling the gate-source headroom of PMOS pass transistor 106 at lower supply voltages, allowing LDO 100 to operate at lower voltages. NVO 104 also reduces the required pass transistor size for given input supply as discussed in further detail below. In one example approach, EA 102 and pass transistor 106 are connected to the same VDD (supply voltage).

In the example approach of FIG. 1, pass transistor 106 and error amplifier 102 form a negative feedback loop. In one such example approach, EA 102 supports an output voltage, $V_E > \Delta V1$ (overdrive voltage of EA's output stage), before its gain rolls off. In a conventional analog LDO (without any offset), the EA voltage, $V_E$, for proper operation is given by $V_E = VDD - VTP - \Delta V2$, where $\Delta V2$ is the pass transistor overdrive voltage and VTP is the PMOS threshold voltage, respectively. Thus, for typical VTP=0.3V, an analog LDO cannot support VDD less than 0.7V (assuming $\Delta V1 = \Delta V2 \approx 0.2$). Negative voltage offset 104 extends supported VDD significantly.

In one example approach, negative voltage offset 104 is a fixed negative offset. In the fixed negative offset example, negative voltage offset 104 is a fixed negative offset (as shown by voltage source VOS). The EA voltage, $V_E$, then becomes $V_E = VDD - VTP - \Delta V2 + VOS$. For VOS=0.4V, the lower limit for VDD is approximately 0.45V.

Figure 2A:
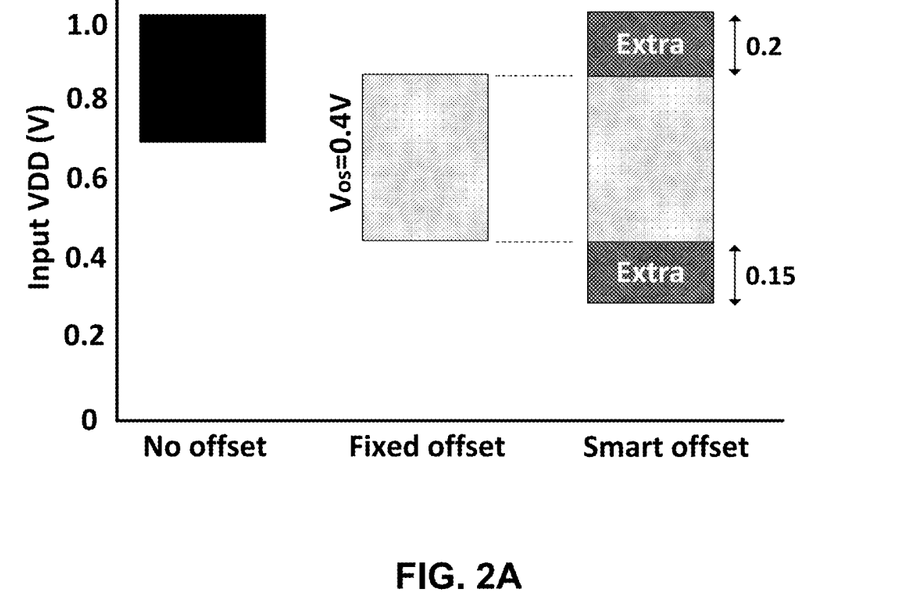
FIG. 2A illustrates ranges of input supply voltages for representative zero offset, fixed offset and adaptive offset LDO circuits, according to aspects of the disclosure.

FIG. 2A illustrates ranges of input supply voltages for representative zero offset, fixed offset and adaptive offset LDO circuits, according to aspects of the disclosure. One problem with the fixed negative offset approach described above is the breakdown voltage, VBD, of pass transistor 106, since $VDD \leq VBD + \Delta V1 - Vos$. As can be seen in FIG. 2A, in the fixed negative offset approach, the lower limit of VDD is reduced but, unfortunately, so is the upper limit due to the breakdown voltage concern. In one example approach, the upper limit problem is addressed by introducing an adaptive offset (smart offset), $VOS = A - A \times VDD$ (where A is a design parameter), such that at lower VDDs LDO 100 maintains a finite offset but at larger voltages (near 1V in 65 nm process), the offset approaches zero. Tests have shown that the smart offset provides approximately additional 400 mV input voltage dynamic range over conventional analog LDOs and approximately 300 mV additional range over a fixed offset LDO.

In one example approach, as the input voltage drops the smart offset increases so that LDO 100 maintains a constant $\Delta V2$ (overdrive voltage of pass transistor) across the pass transistor for different input voltages (ranging from 0.3V to 1.0V). By providing this offset, LDO 100 enables the gate of the pass transistor 106 to go to a negative voltage at lower LDO supply voltages ($V_{DD}$), thus avoiding the exponential bloating of the transistor size. In one example approach, an adaptive offset LDO (AO-LDO) sustains a load of 10 mA and FET width=1000 µm at a 0.3V input supply voltage (point A in FIG. 2B). This clear reduction in minimum input voltage is due to the extra offset introduced.

Figure 2B:
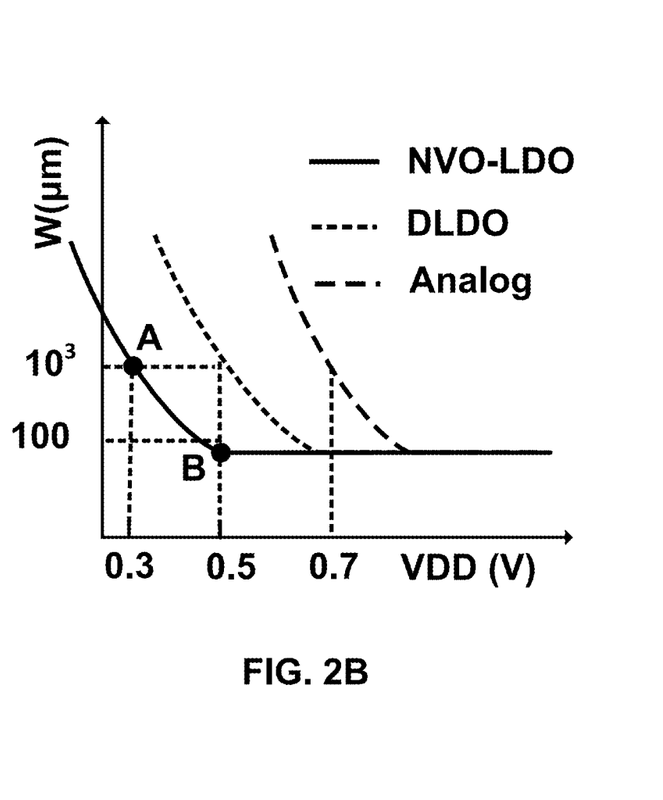
FIG. 2B illustrates minimum pass transistor size versus input supply voltage for analog LDOs, digital LDOs and negative voltage offset LDOs, according to aspects of the disclosure.

The negative voltage offset approach of FIG. 1 also reduces the required field effect transistor (FET) width. FIG. 2B illustrates minimum pass transistor size versus input supply voltage for analog LDOs, digital LDOs and negative voltage offset LDOs, according to aspects of the disclosure. In the example illustrated in FIG. 2B, the loop gain of each LDO depends on the gain of pass transistor 106 and EA 102. Even in large output swing error amplifiers, the minimum $V_E$ is limited by the overdrive voltage of a NMOS transistor, $\Delta V1$ (typically $\Delta V1 \sim 0.2V$). As VE decreases and becomes less than or equal to $\Delta V1$, the EA output stage enters into the triode region thus decreasing the overall EA gain. Therefore, adequate regulation is maintained only if VE is greater than equal to $\Delta V1$. The maximum output voltage, VO,max, is related to the input VDD as, VO,max=VDD−$\Delta V2$. Here $\Delta V2$ denotes the pass transistor overdrive voltage and increases with increased loads for a fixed FET size. To the first order, the power efficiency is given by $\eta = 1 - \Delta V2/VDD$. Thus, it is natural to design the width of the FET corresponding to a minimum possible dropout voltage for which we maintain the pass FET in saturation and stabilize the loop gain. In one example approach, $\Delta V2$ is approximately 0.2V, which is a good compromise between the gm/I current efficiency and FET size.

FIG. 2B shows the LDO pass transistor device width as a function of the input VDD. Note that the device size has to increase to compensate for the lower overdrive voltage that is available at low VDDs. The knee in this figure for an analog LDO is at VDD,min$\approx \Delta V1 + |VTP| + \Delta V2$ which is around 0.7V for |VTP|=0.3V. After this point, for a fixed current, the transistor width increases exponentially as $\Delta V1$ throttles the overdrive for the pass FET. The pass transistor 106 carries the entire load current and is normally quite large in size setting both the DC and transient response due to the large parasitics associated with the analog LDO.

As noted above and as can be seen in FIG. 2B, the width required for an analog LDO pass transistor increases exponentially as VDD approaches 0.7V, becoming unyieldingly large. This was one of the reasons for the design of D-LDOs. For D-LDOs the analog controlled power transistor is replaced with a digitally controlled switch array; the output voltage ($V_O$) is monitored by the comparator instead of the operational amplifier. Thus, the D-LDO eliminates all analog circuits and can operate at input supply voltages as low as 0.5V.

The minimum pass transistor size required for a given input supply voltage is greater for an analog LDO than a D-LDO. The pass FET dimensions for an analog LDO and a D-LDO operating at 0.7V with a load current of IL=10 mA are shown in FIG. 2B. It can be seen that, for the A-LDO, the pass transistor width is approximately 1000 µm for an analog LDO operating at 0.7V with a load current of IL=10 mA while, for the D-LDO, the pass transistor width is less than 100 µm for an analog LDO operating at 0.7V with a load current of IL=10 mA. As both A-LDO and D-LDO move to lower input voltages while keeping the load fixed, however, the width required to support the load increases rapidly. As VDDs approaches $\Delta V1 + VTP$ (~500 mV), the transistor dimensions of the pass transistor of the A-LDO become difficult to realize. This is the reason why analog LDOs are not tenable for lower input VDDs. Likewise, as VDDs approaches approximately 300 mV, the transistor dimensions of the pass transistor of the D-LDO become difficult to realize.

As shown in the example approach of FIG. 2B, for the same current and a 0.5V $V_{DD}$, the minimum pass transistor size for NVO-LDO 100 is significantly less than that of either an analog LDO or a D-LDO. As can be seen in FIG. 2B, for an NVO-LDO 100, minimum FET size reduces from 1000 μm to approximately 100 μm (a 10× reduction in comparison to D-LDOs) along the vertical line at point B. The $V_E$ generated by error amplifier 102 is converted to $V_E^* = V_E - V_{OS}$ and thus it improves the current driving capability as well. Taking the case where $V_{DD}=0.3V$, $V_E=V_{DD}/2$ and $|V_{TP}|=0.3$ V, $V_E^* = V_{DD}/2 - V_{OS} = -0.2V$. Thus, as can be seen in FIG. 2B, there is a leftward shift of the $V_{DD\text{-}vs}W$ curve of approximately 0.2V when using the NOV-LDO 100 of FIG. 1. The NOV-LDO approach shown in FIG. 1 also improves the drive capability by approximately 10×.

An adaptive offset helps in lowering the input VDD as compared to a fixed offset. Since $V_E = V_{DD} - \Delta V_2 - V_{TP} + V_{OS}$, so the fixed offset, $V_{OS}$, is bounded by:

$$\Delta V_1 + |V_{TP}| - V_{DD} \leq V_{OS} \leq |V_{TP}| \quad (1)$$

From Eqn.(1) above, for a fixed offset, the minimum $V_{DD}$ is $\Delta V_1 + \Delta V_2 + 0.1V$ (design margin) ≈ 0.5V. NVO-LDOs 100 that use an adaptive offset, however, allow for $V_{DDS}$ as low as 0.3V.

As noted above, in one example approach, a smart adaptive offset may be designed to follow a value of A−A×VDD. As illustrated in FIG. 1, VOS=VE+VTP+ΔV2−VDD. If VE=VIN/2 (for symmetric EA output), then in one such example approach, VOS≈0.5−0.5×VDD and the design parameter A is chosen to be 0.5. As the input voltage drops the smart offset increases so that a constant ΔV2 is maintained across the pass transistor for different input voltages that range from 0.3V to 1.0V. By providing this offset, we enable the gate of the pass transistor to go to a negative voltage at lower LDO supply voltages (VDD) thus avoiding the exponential bloating of the transistor size seen for analog LDOs. For instance, in the example shown in FIG. 2B, the smart offset LDO (SO-LDO) can sustain a load of 10 mA and FET width=1000 μm at a 0.3V input supply voltage (point A in FIG. 4). This clear reduction in minimum input voltage is due to the extra offset introduced.

Figure 3:
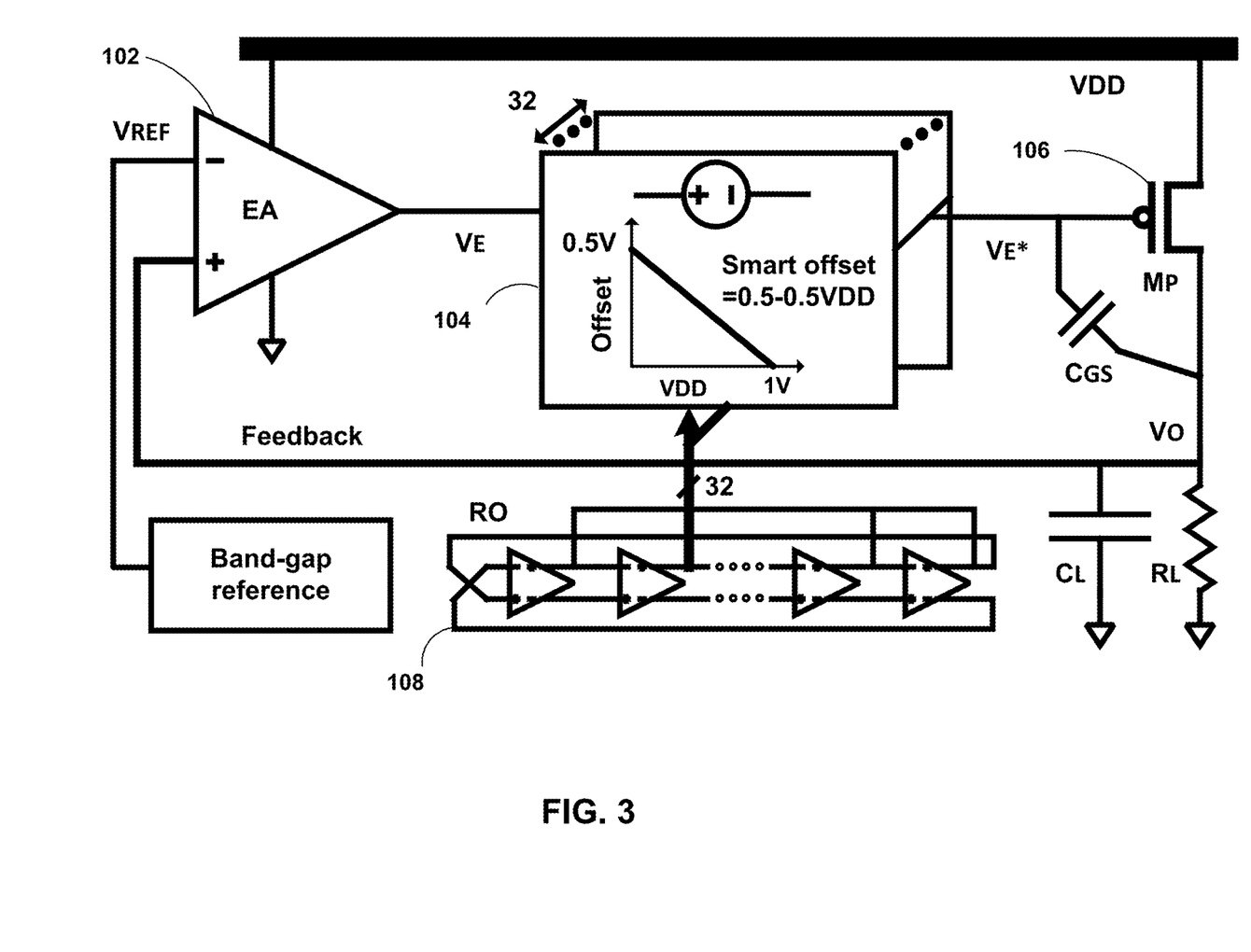
FIG. 3 is a conceptual diagram of a negative voltage offset LDO (NVO-LDO) circuit, according to aspects of the disclosure.

FIG. 3 is a conceptual diagram of a negative offset LDO circuit, according to aspects of the disclosure. In one example approach, $V_{OS}=0.5V-0.5\times V_{DD}$ is realized using a fast-switched capacitor charge pump network. In the example approach of FIG. 3, the EA output voltage $V_E$, feeds into the negative offset-based charge pump which converts it to $V_E^*$. This $V_E^*$ serves as the gate voltage for the pass field effect transistor (FET) 106 implemented by an LVT device. The switching frequency of the charge pump is designed to be at least a decade higher than the loop frequency and, in one such example approach, uses 32 interleaving phases to maintain a low output ripple. In one such example approach, non-overlapping phases Φ1 and Φ2 are generated by a 32-stage ring oscillator 108 coupled to a non-overlap clock generator.

Figure 4A:
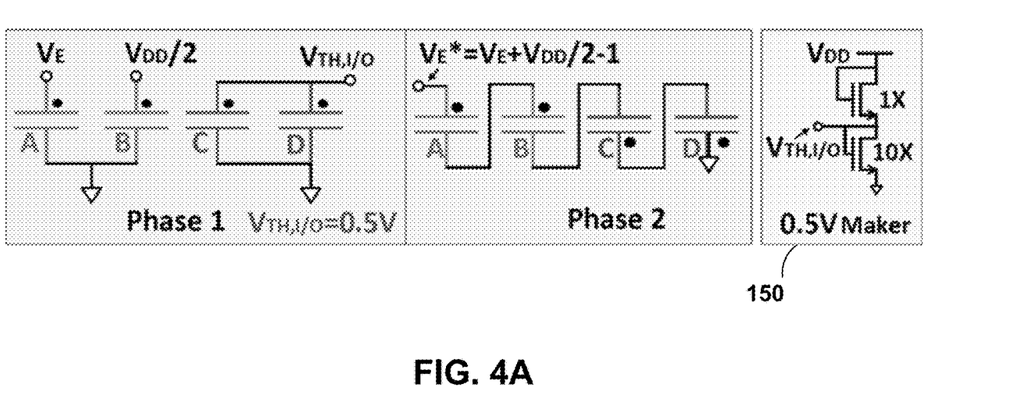
FIGS. 4A and 4B are conceptual diagrams of the charge pump used in both fixed offset and smart offset LDOs, according to aspects of the disclosure.
Figure 4B:
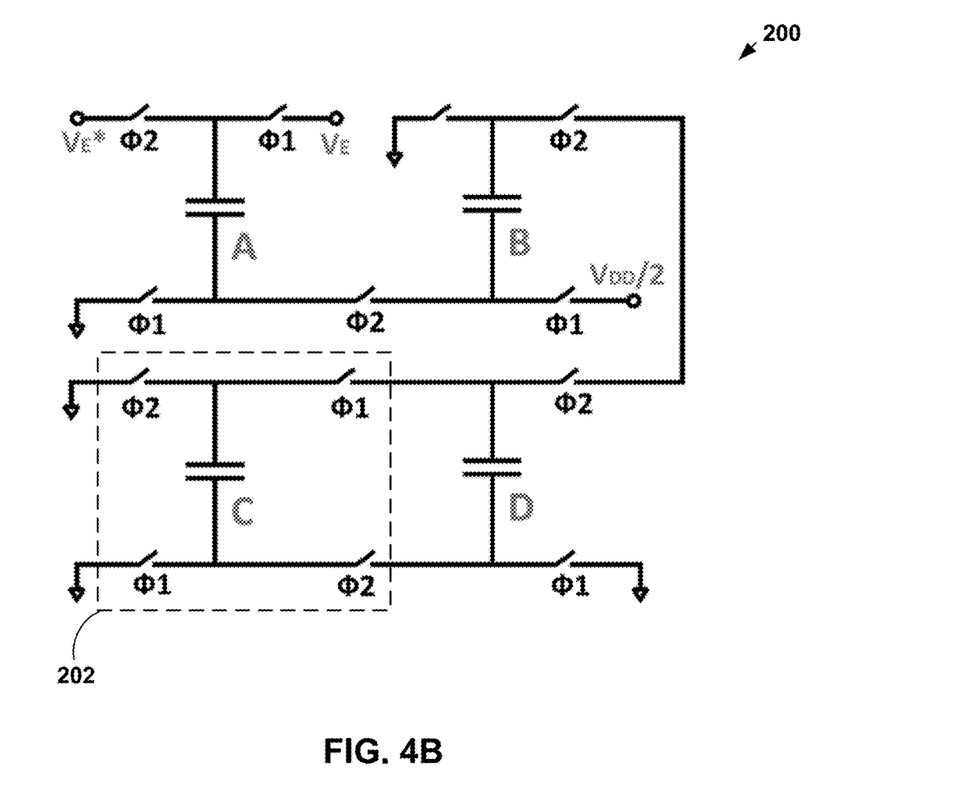

FIGS. 4A and 4B are conceptual diagrams of the charge pump used in both fixed offset and smart offset LDOs, according to aspects of the disclosure. FIG. 4A shows functioning of the charge pump in two phases while FIG. 4B shows an example approach for a circuit diagram for the charge pump of FIG. 4A. In one example approach, the charge pump includes four capacitors operating during two non-overlapping phases, as shown in FIG. 4A. During phase Φ1 bucket capacitor A gets charged to $V_E$, capacitor B gets charged to $V_{DD}/2$ and capacitors C and D get charged to ≈0.5V (created on-chip). In phase Φ2, all the capacitors are connected in series with the capacitors C and D having opposite polarity as shown in FIG. 4A.

FIG. 4B illustrates an example circuit that may be used as the charge pump of FIG. 4A. In the example approach of FIG. 4B, charge pump 200 includes four IPO-OPG unit cells 202 arranged as shown in FIG. 4B. In one example approach, unit cells 202 bring technology portability and scalability to the architecture of charge pump 200. The connections of the four capacitors in two phases are shown in FIG. 4A and are described above.

In some example approaches, the switches shown in FIG. 4B are made of low threshold MOS devices (LVT devices). Since this charge pump has to supply less current at steady state due to the negligible gate leakage current of the PMOS pass transistor, the four capacitors may be of the order of 100 fFs, thus minimizing the area overhead.

In some example approaches, deep-nwell NMOSs serve as switches in order to handle negative voltages. The resultant voltage $V_E^* = V_E + 0.5 \times V_{DD} - 0.5$. As shown at 150 in FIG. 4A, in some example approaches, the 0.5V may be created by $V_{TN}$ (≈500 mV nominal) of a 2.5V I/O NMOS device. In some example approaches, the circuit shown at 150 in FIG. 4A has a total variation of 80 mV with 100C temperature change. In some example approaches, EA 102 is a self-biased folded cascode OTA (which operates in sub-threshold for $V_{DD}$ below 0.7V and in strong inversion for VDD above 0.7V).

Figure 5:
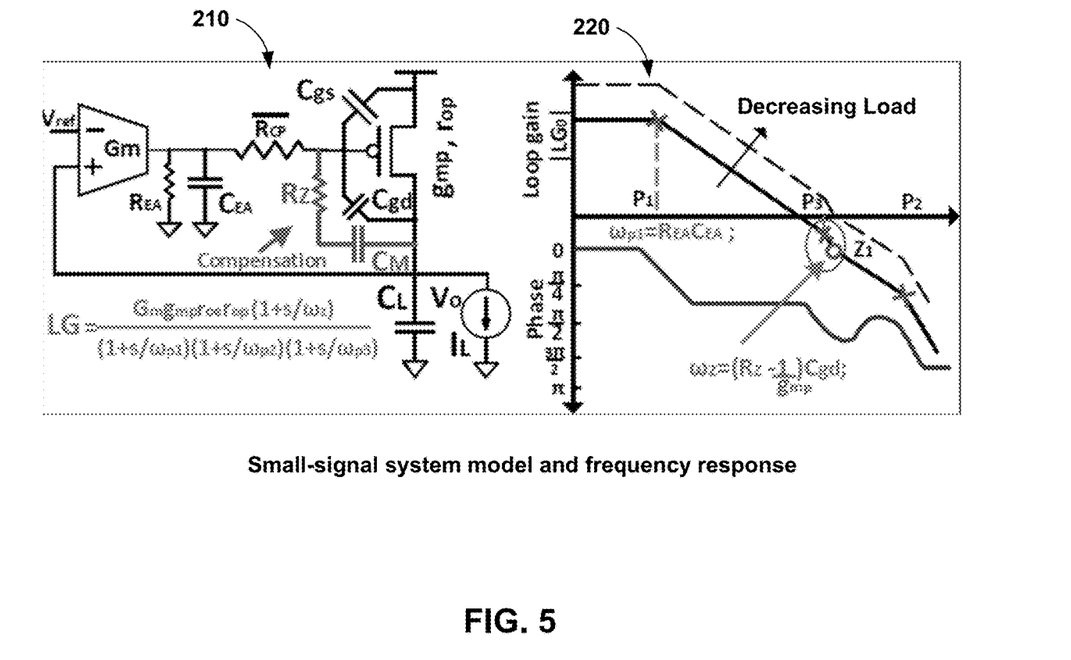
FIG. 5 illustrates a small-signal model of an example NVO-LDO and the corresponding frequency response, according to an aspect of the disclosure.

FIG. 5 illustrates a small-signal model 210 of an example NVO-LDO and the corresponding frequency response 220, according to an aspect of the disclosure. With regard to loop stability analysis and ripple, the loop stability of the circuit may be analyzed by considering the small-signal closed system model 210 of NVO-LDO 100 shown in FIG. 5. In one such approach, the charge pump is represented as an average output resistor, RCP, while the error amplifier is represented as a Gm cell with a single pole roll off. This system has two poles and a left hand zero, caused by the charge pump resistor and $C_{GD}$, which helps with self-compensation. The pole at the output of the error amplifier 102 is dominant while the pole at the LDO output is non-dominant. Thus, for the frequency range that is about a decade lower than the switching frequency, the charge pump equivalent resistor helps realize a lag network. In isolation for the open loop, the gate-source capacitance acts as the filter capacitor for the charge pump thereby further reducing the ripple of the charge pump. The closed loop output impedance suppresses the charge pump ripple at the output.

Figure 6:
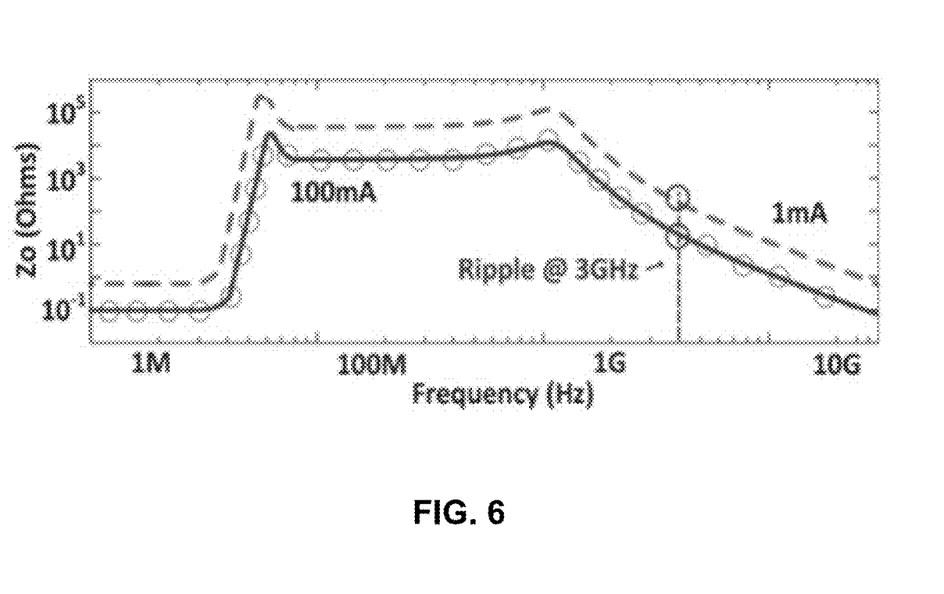
FIG. 6 illustrates measured closed loop impedance of one example negative offset LDO circuit, according to aspects of the disclosure.

FIG. 6 illustrates measured closed loop impedance of one example negative offset LDO circuit, according to aspects of the disclosure. Note that the 3 GHz ripple at a load of 100 mA is suppressed significantly.

Figure 7:
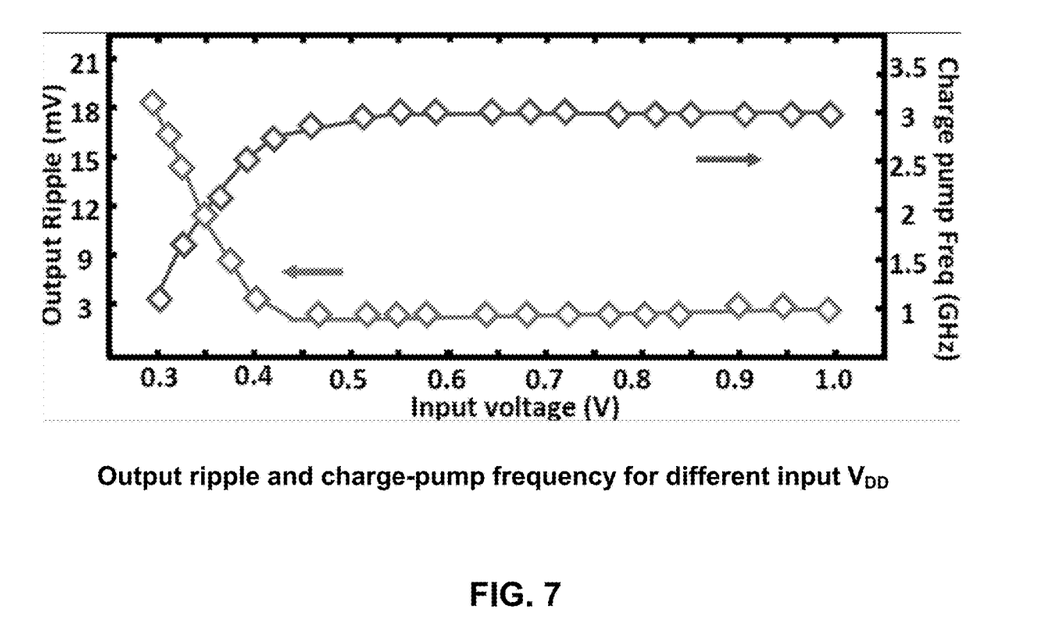
FIG. 7 illustrates output ripple and charge pump frequency vs input voltage of one example, according to aspects of the disclosure.

FIG. 7 illustrates output ripple and charge pump frequency vs input voltage, according to aspects of the disclosure. For VDDs below 0.5V, the switches are not sufficiently turned on, requiring a lower charge pump frequency, which in turn increases the output ripple voltage.

Figure 8:
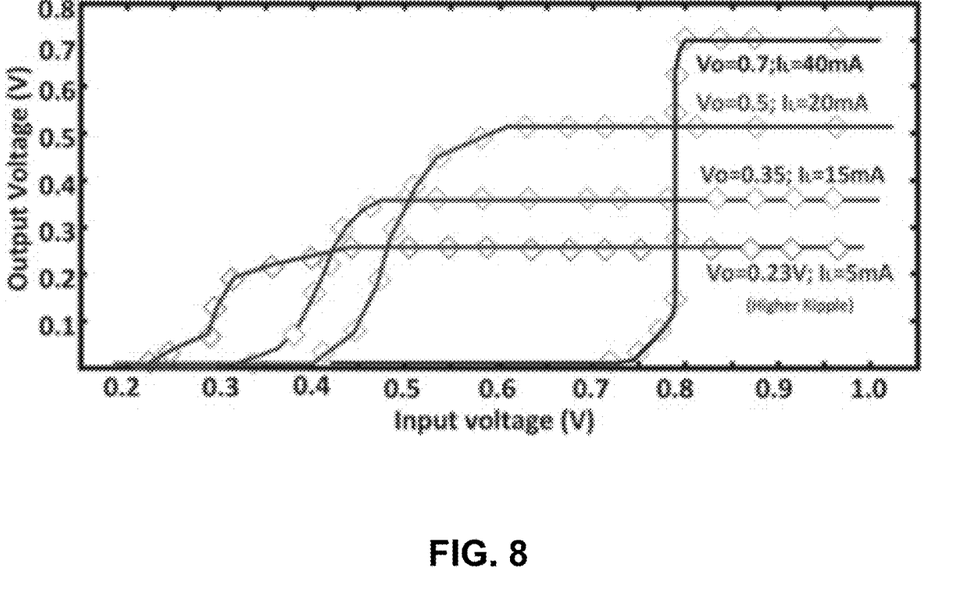
FIG. 8 illustrates measured VOUT (output voltage) –VDD (input voltage) characteristics at different load currents at different output voltages, according to aspects of the disclosure.

FIG. 8 illustrates measured VOUT−VDD (input voltage) characteristics at different IL (load currents) at different output voltages, according to aspects of the disclosure. At VIN equal to 0.4V and VOUT of 0.35V, the measured line regulation is 3.1 mV/V. The NVO-LDO achieves a successful load regulation of 0.65 mV/mA while VIN varies from 0.3V to 1.0V. The measured quiescent current does not depend on IL, and is 11 uA (minimum) at VDD=0.3V, which contrast with the quiescent current increases demonstrated in other LDO designs.

Figure 9:
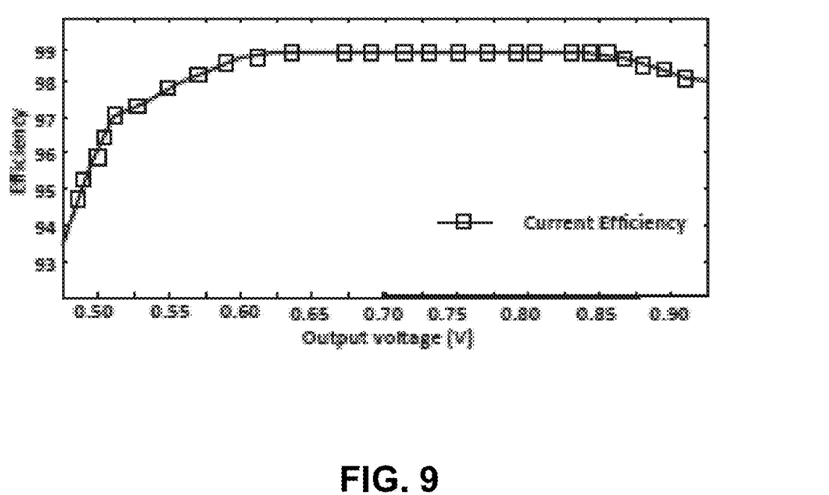
FIG. 9 illustrates NVO-LDO current efficiency at VO=0.7V and VDD=0.9V, according to aspects of the disclosure.

FIG. 9 illustrates NVO-LDO current efficiency at VO=0.7V and VDD=0.9V, according to aspects of the disclosure. In the example shown in FIG. 9, NVO-LDO 100 achieves a peak current efficiency of 99.1% at 0.9-V input and 0.7-V output voltage and demonstrates high current efficiency for output voltages between. The input voltage, active area and the quiescent current are also lower than other LDO designs. Furthermore, EA 102 and the other control circuitry share the input voltage with the LDO unlike designs that use a higher VDD. Finally, due to the 32-phase interleaving the steady state ripple is less than 3 mV for VDDs greater than 0.4V (and often as low as 1 mV), which is an order of magnitude lower than other designs.

Figure 10:
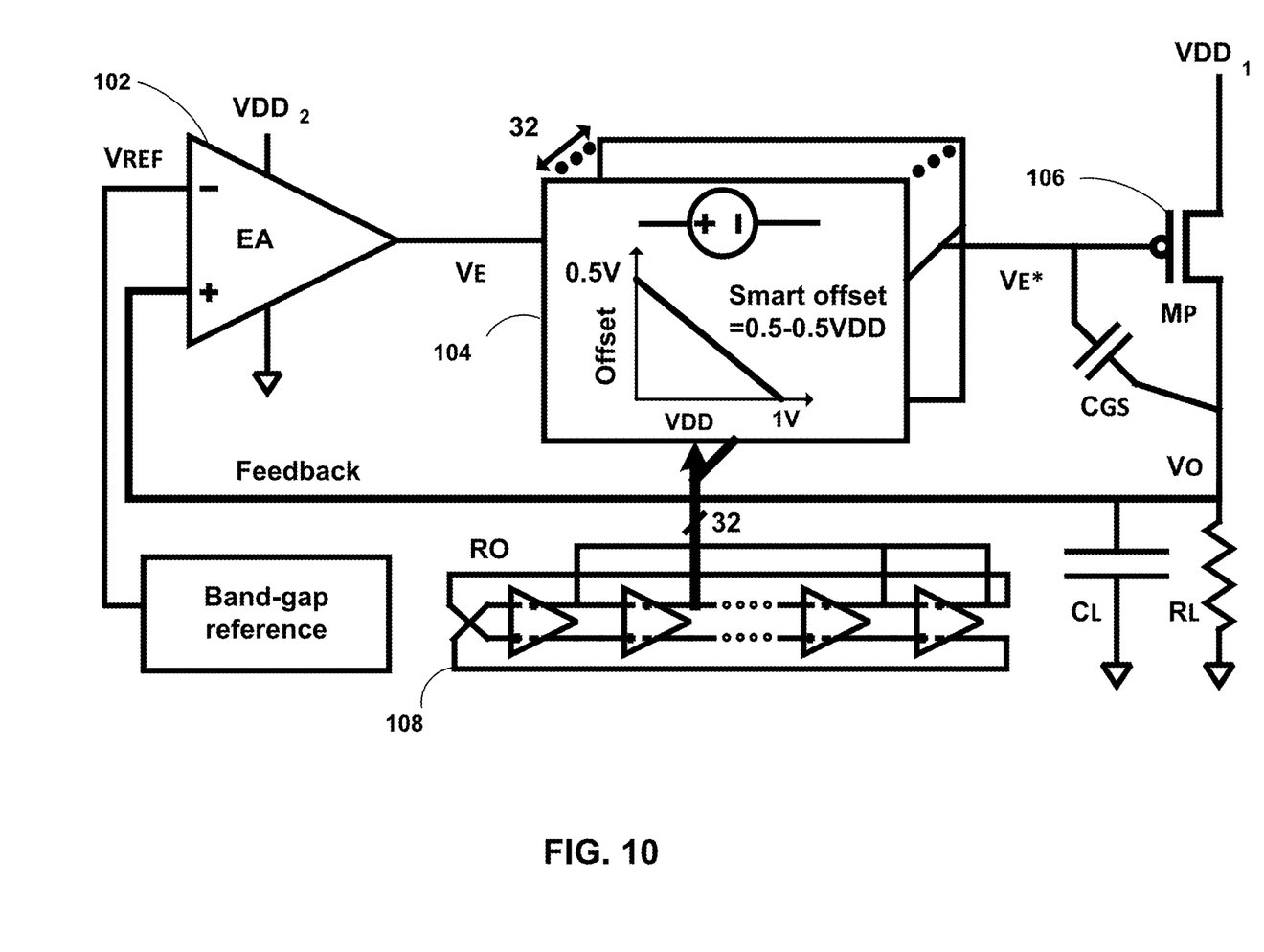
FIG. 10 is a conceptual diagram of another negative offset LDO circuit, according to aspects of the disclosure.

FIG. 10 is a conceptual diagram of another negative offset LDO circuit, according to aspects of the disclosure. As shown in the example of FIG. 10, it may be advantageous in some approaches to isolate the supply voltages of EA 102 and RO 108 from the rest of the circuit. Such an approach may facilitate the LDO to function at voltages even lower than typical threshold voltage of MOS (which is ~0.3V). It may also reduce coupling between the circuits as well.

Figure 11:
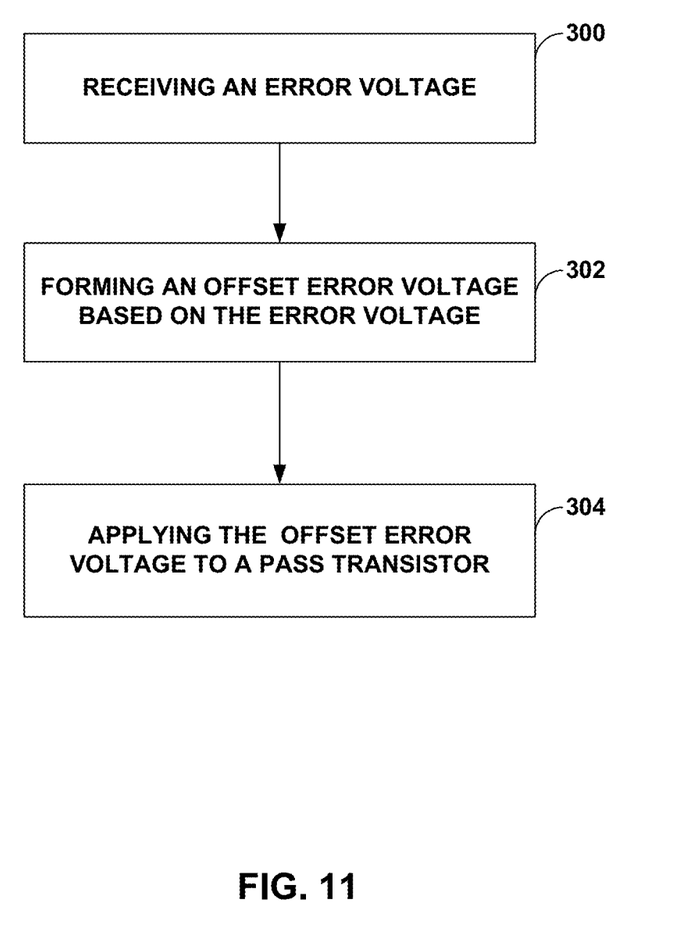
FIG. 11 is a diagram illustrating a method in accordance with one or more techniques of this disclosure.

FIG. 11 is a diagram illustrating a method in accordance with one or more techniques of this disclosure. In the example shown in FIG. 11, a charge pump 104 receives an error voltage $V_E$ (300) and forms an offset error voltage $V_E^*$ (302). In one example approach, forming an offset error voltage $V_E^*$ includes operating four switched capacitors A-D in the charge pump during two non-overlapping phases, Φ1 and Φ2, such that during phase Φ1, capacitor A gets charged to the error voltage $V_E$, capacitor B gets charged to $V_{DD}/2$ and capacitors C and D get charged to ≈0.5V, and during phase Φ2, all the capacitors are connected in series with the capacitors C and D having opposite polarity. In some example approaches, the offset error voltage $V_E^*$ is applied to a gate of the pass transistor 106. In one example approach, EA 102 is a self-biased folded cascode OTA (which operates in sub-threshold for $V_{DD}$ below 0.7V and in strong inversion for $V_{DD}$ above 0.7V).

Other low power amplifies may be used to replace the EA 102 described above. For instance, Abdelfattah et al describe an operational-transconductance-amplifier (OTA) design for ultra-low voltage ultra-low power applications in "An Ultra-Low-Voltage CMOS Process-Insensitive Self-Biased OTA with Rail-to-Rail Input Range," in IEEE Transactions on Circuits and Systems I: Regular Papers, vol. 62, no. 10, pp. 2380-2390, October 2015, the description of which is incorporated herein by reference. The input stage of the proposed OTA utilizes a bulk-driven pseudo-differential pair to allow minimum supply voltage while achieving a rail-to-rail input range. All the transistors in the proposed OTA operate in the subthreshold region. The self-biasing technique obviates the need for extra biasing circuitry, enhances the performance of the OTA, ensures robustness in the OTA to process variations and increases design feasibility under ultra-low-voltage conditions. Moreover, the described biasing technique significantly improves the common-mode and power-supply rejection of the OTA. To further enhance the bandwidth and allow the use of smaller compensation capacitors, a compensation network based on a damping-factor control circuit is exploited. Using this amplifier in place of EA 102 in FIGS. 3 and 9 may improve the minimum input voltage by up to 100 mV without separate power rails.

Ferreira et al describe a bulk-driven Miller OTA in "A 60-dB Gain OTA Operating at 0.25-V Power Supply in 130-nm Digital CMOS Process," in IEEE Transactions on Circuits and Systems I: Regular Papers, vol. 61, no. 6, pp. 1609-1617, June 2014, the description of which is incorporated herein by reference. In the example described by Ferreira et al, the Miller OTA is a bulk-driven Miller OTA operating at 0.25-V power supply in the 130-nm digital CMOS process. The amplifier operates in the weak-inversion region with input bulk-driven differential pair sporting positive feedback source degeneration for transconductance enhancement. Using this amplifier in place of EA 102 in FIGS. 3 and 9 may improve the minimum input voltage by up to 100 mV without separate power rails.

Yang et al describe an inverter-based amplifier in "A 65 nm inverter-based low-dropout regulator with rail-to-rail regulation and over −20 dB PSR at 0.2V lowest supply voltage," 2017 IEEE International Solid-State Circuits Conference (ISSCC), San Francisco, Calif., 2017, pp. 106-107, the description of which is incorporated herein by reference. A similar amplifier is described in R. Harjani and R. K. Palani, "Design of PVT Tolerant Inverter Based Circuits for Low Supply Voltages," CICC, pp. 1-8, 2015, the description of which is incorporated herein by reference. The inverter-based amplifier described by Yang et al may be used in place of EA 102 in FIGS. 3 and 9. Such an approach may improve the minimum input voltage by up to 150 mV without separate power rails.

Solutions for ultra-low voltage LDOs have been presented using either a fixed offset or a smart offset. The fixed offset approach moves the range of input supply voltages supported into the range of 400-800 millivolts while the smart offset approach extends that range to 300-1000 millivolts. The smart offset approach adapts to the input voltage thus facilitating a constant minimum dropout. The charge pump generated fixed and smart offset approaches enable an effective size reduction of the pass transistor at higher input voltages. The smart offset approach furthermore makes operation possible at input voltages of less than 300 millivolts. The NVO-LDO has a 10× device size improvement as compared to D-LDOs and may support a 0.3V-to-1.0V input with a quiescent current of 11 uA. In one example approach, the NVO-LDO may sustain a load variation of 10-100 mA over the 0.3V-to-1.0V input range.

The NVO-LDO further achieves a peak current efficiency of 99.1% at 100 mA load and a 0.9V output voltage. The charge pump runs at a frequency of 3 GHz with 32 phases so that the ripple is less than 3 mV for VDDs≥0.4V which is an order of magnitude better than state of art D-LDOs. The NVO-LDO is simpler to implement than D-LDOs, has lower ripple than D-LDOs and circumvents the minimum VDD limit imposed by analog LDOs.

In one or more examples, the functions described above and in the attached appendices may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1)

tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage components, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A low-dropout (LDO) regulator, comprising:
a pass transistor;
a charge pump connected to the pass transistor; and
an error amplifier connected through the charge pump to the pass transistor, wherein the error amplifier receives a voltage $V_o$ from the pass transistor and generates a voltage $V_E$ based on the voltage $V_O$ and a reference voltage; and
wherein the charge pump receives the voltage $V_E$ from the error amplifier, generates a voltage $V_E^*$ that is lower than $V_E$ by an offset and supplies the voltage $V_E^*$ as a gate voltage to the pass transistor,
wherein the charge pump includes four capacitors A-D operating during two non-overlapping phases, $\Phi 1$ and $\Phi 2$, wherein during phase $\Phi 1$ capacitor A gets charged to $V_E$, capacitor B gets charged to $V_{DD}/2$ and capacitors C and D get charged to approximately 0.5V, and wherein during phase $\Phi 2$ all the capacitors are connected in series with the capacitors C and D having opposite polarity.

2. The LDO regulator of claim 1, wherein the offset is a fixed offset.

3. The LDO regulator of claim 1, wherein the error amplifier is a self-biased operational-transconductance-amplifier (OTA) design.

4. The LDO regulator of claim 3, wherein the error amplifier is a self-biased folded cascode OTA.

5. The LDO regulator of claim 4, wherein the error amplifier is a bulk-driven Miller OTA.

6. The LDO regulator of claim 1, wherein the error amplifier is an inverter-based amplifier.

7. The LDO regulator of claim 1, wherein the charge pump includes a fast-switched capacitor charge pump network.

8. The LDO regulator of claim 1, wherein the charge pump operates at a frequency such that charge pump ripple is attenuated by closed loop control of the regulator.

9. A low-dropout (LDO) regulator, comprising:
a pass transistor;
a charge pump connected to the pass transistor; and
an error amplifier connected through the charge pump to the pass transistor, wherein the error amplifier receives a voltage $V_O$ from the pass transistor and generates a voltage $V_E$ based on the voltage $V_O$ and a reference voltage; and
wherein the charge pump receives the voltage $V_E$ from the error amplifier, generates a voltage $V_E^*$ that is lower than $V_E$ by an offset and supplies the voltage $V_E^*$ as a gate voltage to the pass transistor,
wherein the charge pump includes a fast-switched capacitor charge pump network, and
wherein the fast-switched capacitor charge pump network operates on non-overlapping phases $\Phi 1$ and $\Phi 2$ generated by a ring oscillator coupled to a non-overlapping clock generator.

10. The LDO regulator of claim 9, wherein the ring oscillator is a 32-stage ring oscillator.

11. A negative voltage offset low-dropout (NVO-LDO) regulator, comprising:
a pass transistor; and
a negative voltage offset circuit connected to the pass transistor, wherein the negative voltage offset circuit receives an error voltage $V_E$, forms an offset error voltage $V_E^*$, and applies the offset error voltage VE* to a gate of the pass transistor, wherein forming includes operating four switched capacitors A-D during two non-overlapping phases, $\Phi 1$ and $\Phi 2$ such that:
during phase $\Phi 1$, capacitor A gets charged to the error voltage $V_E$, capacitor B gets charged to $V_{DD}/2$ and capacitors C and D get charged to 0.5V, and during phase Φ2, all the capacitors are connected in series with the capacitors C and D having opposite polarity.

12. A negative voltage offset low-dropout (NVO-LDO) regulator, comprising:
a pass transistor; and
a charge pump connected to the pass transistor, wherein the charge pump includes four switched capacitors A-D and wherein the charge pump:
receives an error voltage $V_E$;
forms an offset error voltage $V_E^*$, wherein forming includes operating the four switched capacitors A-D in the charge pump during two non-overlapping phases, Φ1 and Φ2, such that:
during phase Φ1, capacitor A gets charged to the error voltage $V_E$, capacitor B gets charged to $V_{DD}/2$ and capacitors C and D get charged to ≈0.5V, and
during phase Φ2, all the capacitors are connected in series with the capacitors C and D having opposite polarity; and
applies the offset error voltage $V_E^*$ to a gate of the pass transistor.

13. The regulator of claim 12, wherein the charge pump operates at a frequency such that charge pump ripple is attenuated by closed loop control of the regulator.

14. In an LDO regulator having a supply voltage VDD, a method, comprising:
receiving an error voltage $V_E$; and
generating an offset error voltage $V_E^*$ from the error voltage $V_E$, wherein generating includes operating a charge pump having four switched capacitors A-D using a clock having two non-overlapping phases, Φ1 and Φ2, such that:
during phase Φ1, capacitor A gets charged to the error voltage $V_E$, capacitor B gets charged to $V_{DD}/2$ and capacitors C and D get charged to 0.5V, and
during phase Φ2, all the capacitors are connected in series with the capacitors C and D having opposite polarity.

15. The method of claim 14, wherein the LDO has a closed loop control and wherein the clock has a frequency selected such that charge pump ripple is attenuated by the closed loop control.

16. An LDO regulator, comprising:
a pass transistor connected to an LDO supply voltage VDD; and
an offset module connected to the pass transistor, wherein the offset module receives an error voltage $V_E$, and provides a voltage $V_E^*$ to a gate of the pass transistor, wherein $V_E^* = V_E - V_{OS}$, where $V_{OS} = A - A \times V_{DD}$, where A is a number greater than zero and less than one,
wherein the offset module includes a charge pump having four capacitors A-D operating during two non-overlapping phases, Φ1 and Φ2,
wherein during phase Φ1 capacitor A is charged to approximately $V_E$ capacitor B is charged to approximately $A \times V_{DD}$ and capacitors C and D are charged to approximately A Volts, and
wherein during phase Φ2 all the capacitors are connected in series with the capacitors C and D having opposite polarity.

17. The LDO regulator of claim 16, wherein A=0.5.

18. The LDO regulator of claim 16, wherein A is a function of lithography.

* * * * *

UNITED STATES PATENT AND TRADEMARK OFFICE
CERTIFICATE OF CORRECTION

| | |
|---|---|
| PATENT NO. | : 10,873,257 B2 |
| APPLICATION NO. | : 16/563160 |
| DATED | : December 22, 2020 |
| INVENTOR(S) | : Ramesh Harjani and Saurabh Chaubey |

Page 1 of 1

It is certified that error appears in the above-identified patent and that said Letters Patent is hereby corrected as shown below:

In the Claims

Column 10, Claim 11, Line 67 reads: "C and D get charged to 0.5V" should read -- C and D get charged to $\approx 0.5V$ --
Column 12, Claim 14, Line 3 reads: "C and D get charged to 0.5V" should read -- C and D get charged to $\approx 0.5V$ --

Signed and Sealed this
Nineteenth Day of April, 2022

Katherine Kelly Vidal
*Director of the United States Patent and Trademark Office*